(12) United States Patent
Chu et al.

(10) Patent No.: US 10,523,416 B2
(45) Date of Patent: Dec. 31, 2019

(54) INDEPENDENT PACKET DETECTION METHOD USING SYNCHRONIZATION WORDS WITH ORTHOGONALITY AND RECEIVER THEREFOR

(71) Applicant: ABOV Semiconductor co., Ltd., Cheongju-si, Chungcheongbuk-do (KR)

(72) Inventors: Sang Young Chu, Bucheon-si (KR); Ki Tae Moon, Seoul (KR); Suk Kyun Hong, Seoul (KR)

(73) Assignee: ABOV Semiconductor co., Ltd., Cheongju-si, Chungcheongbuk-Do (KR)

( * ) Notice: Subject to any disclaimer, the term of this patent is extended or adjusted under 35 U.S.C. 154(b) by 0 days.

(21) Appl. No.: 16/157,034

(22) Filed: Oct. 10, 2018

(65) Prior Publication Data

US 2019/0207743 A1 Jul. 4, 2019

(30) Foreign Application Priority Data

Dec. 29, 2017 (KR) .......................... 10-2017-0184495

(51) Int. Cl.
*H04L 7/04* (2006.01)
*H04L 7/00* (2006.01)
*H04L 27/14* (2006.01)

(52) U.S. Cl.
CPC ............ *H04L 7/042* (2013.01); *H04L 7/0079* (2013.01); *H04L 27/14* (2013.01)

(58) Field of Classification Search
CPC ........ H04L 7/042; H04L 7/0079; H04L 27/14
See application file for complete search history.

(56) References Cited

U.S. PATENT DOCUMENTS

| 6,642,797 | B1 | 11/2003 | Luo et al. | |
| 6,829,288 | B2* | 12/2004 | Orava | H04L 7/042 |
| | | | | 375/132 |
| 7,953,178 | B2 | 5/2011 | Kim et al. | |
| 9,825,791 | B2* | 11/2017 | Moon | H04B 7/26 |
| 9,954,701 | B2* | 4/2018 | Chu | H04L 27/148 |
| 2006/0203925 | A1 | 9/2006 | Pirooz et al. | |
| 2008/0205492 | A1* | 8/2008 | Gorday | H04B 1/707 |
| | | | | 375/150 |
| 2009/0096519 | A1* | 4/2009 | El-Agha | H03D 3/006 |
| | | | | 329/300 |

(Continued)

FOREIGN PATENT DOCUMENTS

| KR | 10-2017-0079385 A | 7/2017 |
| KR | 10-2007-0107387 A | 11/2017 |

*Primary Examiner* — Jaison Joseph
(74) *Attorney, Agent, or Firm* — PNJ IP Law, P.C.

(57) ABSTRACT

A receiver performs independent packet detection using synchronization words with orthogonality when multiple signals on which frequency-shift keying is performed coexist. The receiver includes a frequency demodulator generating a quasi-amplitude modulation signal that has a value proportional to frequency shift from the first signal or second signal being received, a sign discriminator discriminating a sign of the generated quasi-amplitude modulation signal, and a multi-binary correlator calculating a first correlation value which is a binary correlation value between the discriminated sign and a first synchronization word and calculating a second correlation value which is a binary correlation value between the discriminated sign and a second synchronization word.

18 Claims, 11 Drawing Sheets

(56) References Cited

U.S. PATENT DOCUMENTS

2013/0195229 A1* 8/2013 Cheng ................ H04L 27/0014
375/343
2019/0028316 A1* 1/2019 Chu .......................... H04L 7/04

* cited by examiner

| Preamble<br>8 μs | Access Address<br>32 μs | PDU, N bytes<br>N*8 μs | CRC<br>24 μs |
|---|---|---|---|

INDEPENDENT PACKET DETECTION METHOD USING SYNCHRONIZATION WORDS WITH ORTHOGONALITY AND RECEIVER THEREFOR

CROSS REFERENCE TO RELATED APPLICATION

The present application claims priority to Korean Patent Application No. 10-2017-0184495, filed Dec. 29, 2017, the entire contents of which is incorporated herein for all purposes by this reference.

BACKGROUND OF THE INVENTION

Field of the Invention

The present invention relates generally to a packet detection method and receiver therefor in an environment where multiple signals on which frequency-shift keying (FSK) is performed coexist. More particularly, the present invention relates to a method and receiver for independently and stably detecting a packet by using synchronization words with orthogonality or quasi-orthogonality.

Description of the Related Art

Frequency-shift keying used in wireless communications is a scheme of transmitting digital information consisting of a binary number "1b" and a binary number "0b" in frequencies of an analog carrier. The binary number "1b" is converted into a high frequency (frequency shift in positive (+) direction) and the binary number "0b" is converted into a low frequency (frequency shift in negative (−) direction). In order to effectively use the frequency band in the conversion process, Gaussian frequency-shift keying modulation waveform to which a Gaussian filter is applied may be used.

Figure 1:
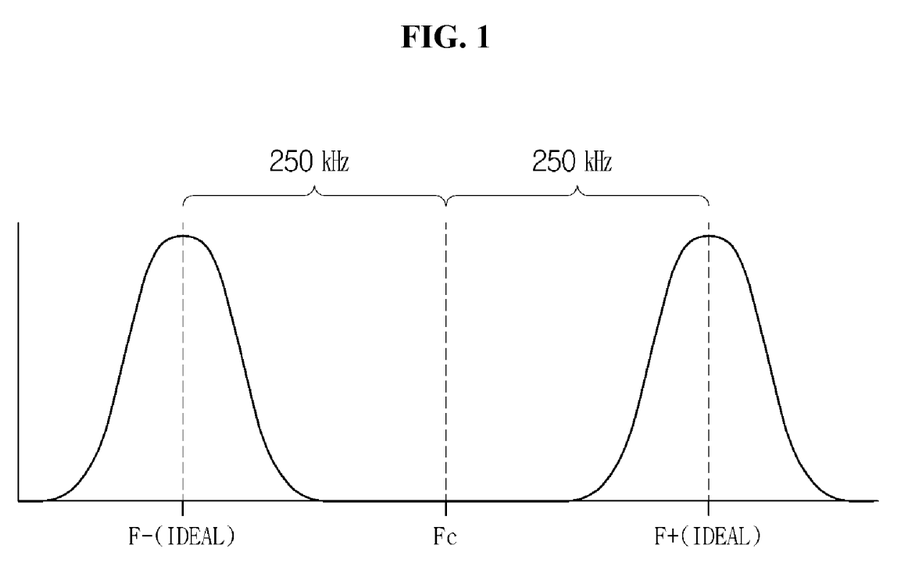
FIG. 1 is a diagram illustrating a frequency characteristic of a frequency-shift keying signal transmitted by a Bluetooth transmission device in an ideal environment in which no noise and no frequency offset are present.

In the case of Bluetooth Smart or Bluetooth Low Energy which is a communication protocol using frequency-shift keying scheme, Core Specification version 5.0 defines that a modulation index indicating the size of minimum-maximum frequency shift has a value ranging 0.495 to 0.505. FIG. 1 shows that a symbol transmission rate Fs=1 Ms/s of a symbol transmitted at a carrier frequency Fc in the industrial, scientific and medical (ISM) bands of 2.4 GHz and effective minimum-maximum frequency shift of a modulation signal with a modulation index h=0.5. Referring to FIG. 1, in the symbol has a transmission rate Fs=1 Ms/s, the signal of the binary number "1b" corresponding to +1 symbol has frequency shift (frequency shift in positive (+) direction) of F+=+250 kHz from the center frequency Fc, and the signal of the binary number "0b" corresponding to −1 symbol has frequency shift (frequency shift in negative (−) direction) of F−=−250 kHz from the center frequency Fc.

Figure 2:
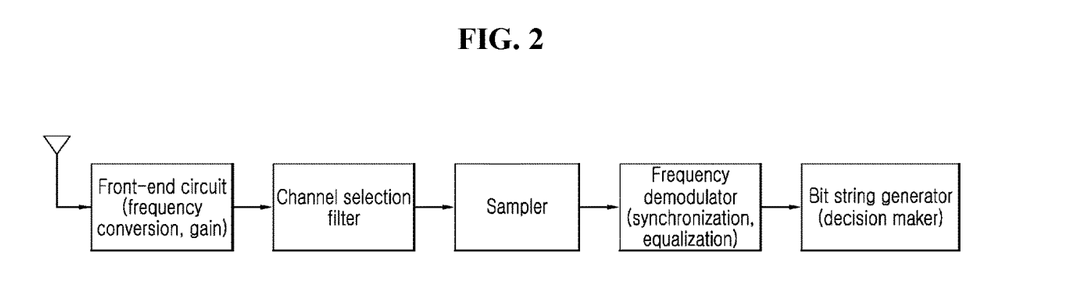
FIG. 2 is a block diagram illustrating configuration of a conventional general Bluetooth receiver.

FIG. 2 shows fundamental blocks of a conventional general frequency-shift keying signal reception device. Referring to FIG. 2, a reception device includes: a front-end circuit obtaining a baseband signal by increasing the gain of an attenuated signal to have a constant size and by removing a carrier component from the modulated signal; a filter selectively passing a desired channel; a sampler converting an analog signal to a digital signal; a frequency demodulator converting a frequency modulation signal to a quasi-amplitude modulation signal and enhancing the degraded quality of the signal due to noise and distortion; and a bit string generator (or decision maker) obtaining a source bit string (binary string) by performing discrimination at symbol intervals.

Figure 3:
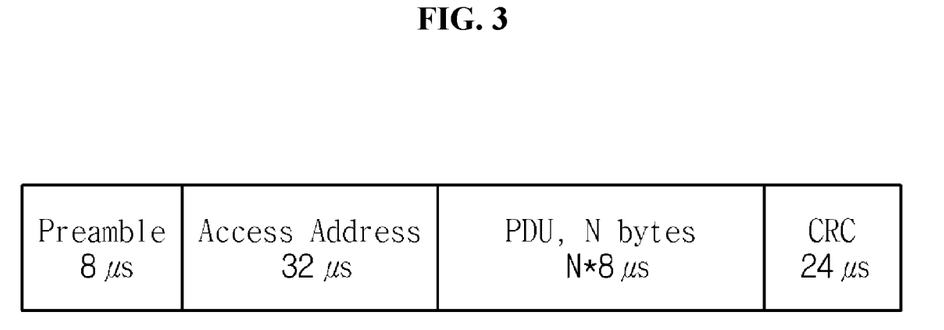
FIG. 3 is a diagram illustrating a packet structure of an LE UNCODED PHY signal of Bluetooth Smart Core Specification version 5.0.
Figure 4:
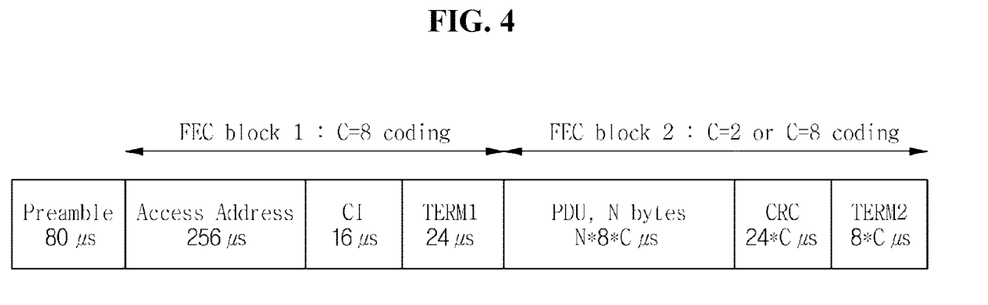
FIG. 4 is a diagram illustrating a packet structure of an LE CODED PHY signal of Bluetooth Smart Core Specification version 5.0.
Figure 5:
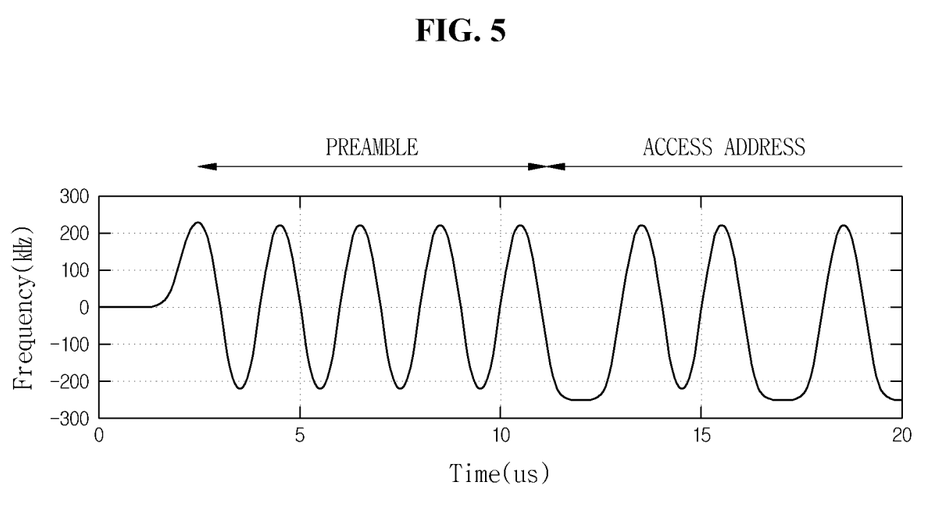
FIG. 5 is a diagram illustrating a preamble waveform after an LE UNCODED PHY packet signal of Bluetooth Smart Core Specification version 5.0 passes through a frequency demodulator of a reception device in an ideal environment where no carrier frequency offset is present.
Figure 6:
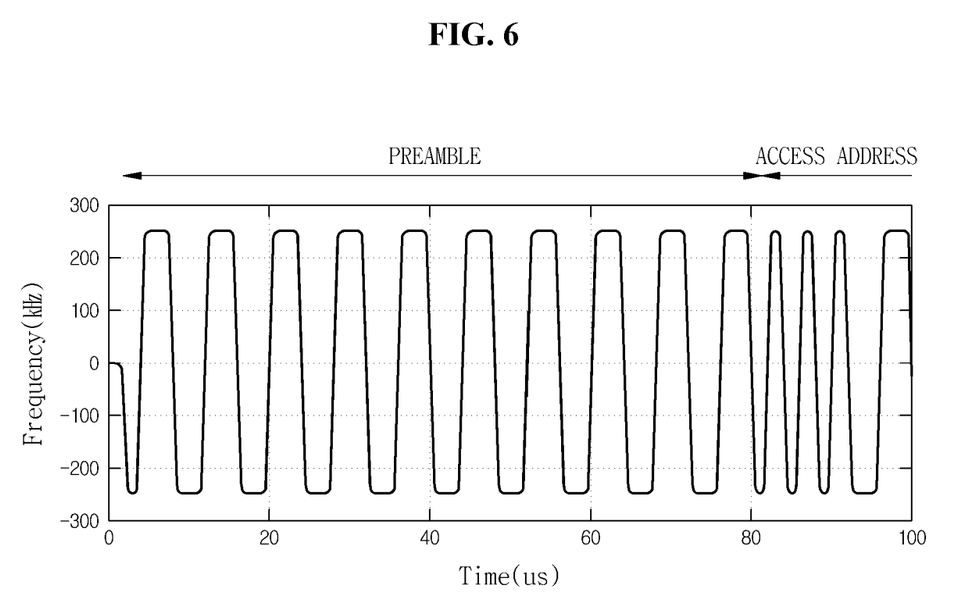
FIG. 6 is a diagram illustrating a preamble waveform after an LE CODED PHY packet signal of Bluetooth Smart Core Specification version 5.0 passes through a frequency demodulator of a reception device in an ideal environment where no carrier frequency offset is present.

In the meantime, in Core Specification version 5.0 released by the Bluetooth Special Interest Group (Bluetooth SIG), defined is that the packet format in Bluetooth Smart Core Specification version 5.0 is divided into low-energy (LE) UNCODED PHY shown in FIG. 3 and LE CODED PHY shown in FIG. 4. The LE UNCODED PHY shown in FIG. 3 is the same as the packet structure in previous Core Specification version 4.2. The LE CODED PHY shown in FIG. 4 is the packet form introduced from Core Specification version 5.0, and consists of a preamble, a forward error correction block 1 (FEC block 1), and a forward error correction block 2 (FEC block 2). The preamble is used for packet synchronization and equalization. The FEC block 1 is coded at a fixed coding rate of C=8, and the FEC block 2 is coded at a predetermined coding rate of C=2 or C=8 depending on a value defined in a CI field of the FEC block 1. The overall packet has a transmission rate of 1 Ms/s. FIGS. 5 and 6 illustrate LE UNCODED PHY and LE CODED PHY baseband signals, respectively.

In general, a signal transmitted by a transmission device is subjected to distortion of the size and phase in the process of reaching a reception device through a channel. Implementation as an analog front-end with low power including a poor quality mixer, filter, amplifier, and the like to increase price competitiveness may degrade overall system performance due to a decrease in matching characteristics of elements. Typical examples include nonlinearity, IQ mismatching, VCO phase noise, frequency offset, timing offset, and the like. Particularly, in the case of the frequency-shift keying scheme in which digital information is transmitted at frequencies, carrier frequency offset between transmission and reception ends is fatal and increases the probability of discrimination error of a reception end decision maker.

In Bluetooth Smart, data is made into a packet for communication. Prior to data transmission associated to a link layer, continuously repeated pilot signals are transmitted for being used in packet detection of a reception end, symbol timing, and frequency offset estimation. Referring to FIGS. 3 and 4, an initial preamble corresponds to the pilot signal. The preamble is uniquely defined for each specification. In Bluetooth Smart Core Specification version 5.0, an LE UNCODED PHY packet has a pattern in which a binary string "10b" or "01b" is repeated four times in a row, and an LE CODED PHY packet has pattern in which a binary string "00111100b" is repeated 10 times in a row.

The reason for transmitting the repeated pattern is to estimate frequency offset with an autocorrelation operation as shown in Equation 1. The result of the autocorrelation operation of the reception signal is expressed as the sum of an ensemble average of transmission signals attenuated to an arbitrary size A and an ensemble average of noise components. When the number M of samples is set to be the same as that of the cycles of the repeated pattern, the ensemble average of the transmission signals is one. When the number M of samples is set to be sufficiently large, the ensemble average of noise components converges to zero due to averaging effect. As a result, frequency offset (Q) is obtained by monitoring change in phase ($e^{j\Delta\Omega m}$) of the autocorrelation operation output.

$$E\{r(n)r*(n-M)\} =$$ [Equation 1]

$$|A|^2 E\{s(n)s*(n-M)\}e^{j\Delta\Omega M} + E\{n(n)n*(n-M)\} =$$

$$|A|^2 e^{j\Delta\Omega M}$$

However, autocorrelation operation as in Equation 1 is extremely complex. As an implementation method to solve the problem, there is a method using an output of a frequency demodulator that converts a frequency modulation (FM) signal into a quasi-amplitude modulation (AM) signal. As the LE UNCODED PHY packet shown in FIG. 5 and the LE CODED PHY packet shown in FIG. 6, the frequency demodulation waveform of the preamble appears in the sine wave-like form in which frequency shift is repeated in negative (−) and positive (+) directions. FIGS. 5 and 6 show the case where there is no external carrier frequency offset. The demodulation waveform of the preamble of the baseband that has passed through the frequency demodulator of the reception end has the form in which minimum and maximum frequency shifts have opposite polarities while the absolute sizes are the same. Thus, the median of minimum frequency shift and maximum frequency shift is calculated as zero. Comparing with this, when there is carrier frequency offset, the preamble has a tendency to appear to be biased by a constant corresponding to relevant offset, and the median (fo) of minimum frequency shift and maximum frequency shift is calculated as carrier frequency offset rather than zero. Accordingly, using this principle, U.S. Pat. No. 6,642,797 disclosed a technology for estimating carrier frequency offset by simply calculating "a minimum-maximum median", instead of the complex autocorrelation operation shown in Equation 1.

Figure 7:
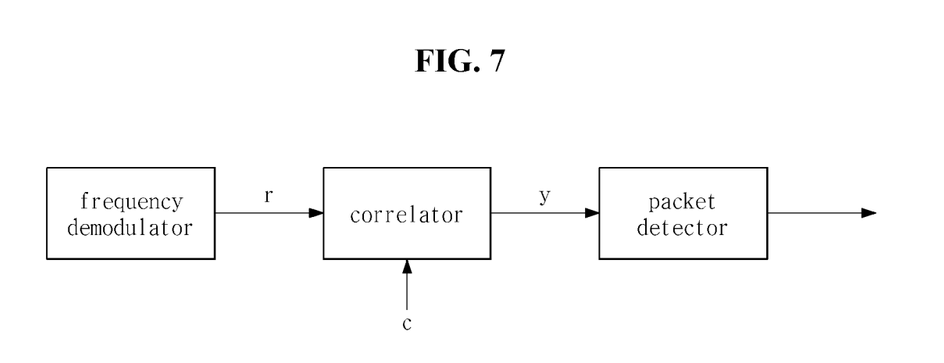
FIG. 7 is a block diagram illustrating a packet detection method with respect to a conventional correlation operation method.

In the meantime, a signal compensated for frequency offset is used as an input to a packet detector at the subsequent step. FIG. 7 shows a commonly used packet detection block which consists of a correlator and a packet detector. The packet detector includes a threshold detector, and determined that a packet is detected when an output of the correlator is equal to or larger than a predetermined threshold value. Equation 2 represents an equation for a correlation measure y between a signal (demodulated signal, r) which has passed through a carrier frequency offset compensator and a pre-defined synchronization word c. Here, N is the number of samples used in correlation measure calculation and is generally set as a multiple of the synchronization word. The threshold detector determines that a valid packet is present when the correlation measure is equal to or greater than the determined threshold value, and then performs a normal decoding process on a protocol data unit.

$$y[n] = \sum_{k=0}^{N-1} c[n]r[n-k+(N-1)]$$ [Equation 2]

However, a conventional correlator performs an operation in Equation 2 by inputting a multi-bit signal. Thus, when implemented in hardware description language (HDL), a storage space for multiple bits and a fixed-point operation with high resolution are required. In a Bluetooth smart device which is intended to implement analog elements with low cost and low power, a large chip area and a digital operation with high power are specifications that should be avoided so improvement is required.

Also, according to Equation 2, since the correlation measure (or a correlation value), which is an output from the correlator, is directly affected by the size of the input signal, when automatic gain control is inaccurate, the correlation measure value is also inaccurate. Therefore, the threshold detector requires an additional device for continuously monitoring the size of the signal and applying it in determining the threshold value in real time, resulting in an increase in the operation amount.

As an example of a typical Bluetooth receiver, in the LE CODED PHY and the LE UNCODED PHY, there is a preamble and an access address for pilot use predetermined between transmission and reception ends. In the LE UNCODED PHY mode, the preamble is 8 μsec, which very short and appropriate to be used as a synchronization word for packet detection, and thus a 32-μsec access address having a relatively long slot is used as the synchronization word. However, unlike the LE UNCODED PHY, since the access address is encoded with the CI field in the FEC block 1 and is transmitted, the LE CODED PHY has a problem that additional signal processing is required for use as the synchronization word.

Also, in the environment where multiple signals on which frequency-shift keying is performed coexist, such as the LE CODED PHY, the LE UNCODED PHY, and the like, the receiver does not know in advance which type of signal will come in a synchronized particular time slot and also whether a signal will come in the relevant time slot. Therefore, an operation is performed in such a manner than a search window for packet detection is opened according to the relevant time slot and a sleep mode is entered when no packet is detected within the time to wait for the subsequent time slot so as to reduce power consumption. Here, since the packet detection may enter an abnormal state, a supplementary device such as a reset, and the like is additionally required. Accordingly, in order to solve this situation efficiently, required is an effort to make the receiver operate stably by detecting a required packet and filtering out an unnecessary packet.

The foregoing is intended merely to aid in the understanding of the background of the present invention, and is not intended to mean that the present invention falls within the purview of the related art that is already known to those skilled in the art.

DOCUMENT OF RELATED ART (Patent Document 1) U.S. Pat. No. 6,642,797.

SUMMARY OF THE INVENTION

Accordingly, the present invention has been made keeping in mind the above problems occurring in the related art, and the present invention is intended to propose a method of independently and stably detecting a packet and a receiver therefor, the method and receiver being capable of improving implementation complexity of a complex correlation operation method in an environment where multiple signals on which frequency-shift keying is performed coexist and being effective for reducing inaccuracy of automatic gain control (AGC).

In order to achieve the above object, according to one aspect of the present invention, there is provided a frequency-shift keying signal receiver performing independent packet detection in an environment where a first signal and a second signal on which frequency-shift keying is performed coexist, the receiver including: a frequency demodulator generating a quasi-amplitude modulation signal that has a value proportional to frequency shift from the first signal or second signal being received; a sign discriminator discriminating a sign of the generated quasi-amplitude modulation signal; and a multi-binary correlator calculating a first correlation value that is a binary correlation value between the discriminated sign and a first synchronization word and calculating a second correlation value that is a binary correlation value between the discriminated sign and a second synchronization word, wherein the first and second synchronization words have orthogonality or quasi-orthogonality to each other.

The receiver may further include a packet detector determining packet detection of the first signal when the calculated first correlation value is equal to or greater than a first threshold value or determining packet detection of the second signal when the calculated second correlation value is equal to or greater than a second threshold value.

The receiver may further include a packet detector entering a standby mode when the calculated first and second correlation values are less than first and second threshold values, respectively.

The calculated first and second correlation values may be values calculated regardless of attenuation sizes of the received first and second signals.

The first correlation value may be calculated by Exclusive OR (XOR) of the discriminated sign and the first synchronization word, and the second correlation value may be calculated by Exclusive OR (XOR) of the discriminated sign and the second synchronization word.

The first and second synchronization words may be a preamble of the first signal and an access address of the second signal, respectively.

In order to achieve the above object, according to another aspect of the present invention, there is provided a frequency-shift keying signal reception method performing independent packet detection in an environment where a first signal and a second signal on which frequency-shift keying is performed coexist, the reception method including: generating a quasi-amplitude modulation signal that has a value proportional to frequency shift from the first signal or second signal being received; discriminating a sign of the generated quasi-amplitude modulation signal; calculating a first correlation value that is a binary correlation value between the discriminated sign and a first synchronization word; and calculating a second correlation value that is a binary correlation value between the discriminated sign and a second synchronization word, wherein the first and second synchronization words have orthogonality or quasi-orthogonality to each other.

The reception method may further include determining packet detection of the first signal when the calculated first correlation value is equal to or greater than a first threshold value, or determining packet detection of the second signal when the calculated second correlation value is equal to or greater than a second threshold value.

The reception method may further include entering a standby mode when the calculated first correlation value is less than a first threshold value and the calculated second correlation value is less than a second threshold value.

The calculated first and second correlation values may be values calculated regardless of attenuation sizes of the received first and second signals.

The first correlation value may be calculated by Exclusive OR (XOR) of the discriminated sign and the first synchronization word, and the second correlation value may be calculated by Exclusive OR (XOR) of the discriminated sign and the second synchronization word.

The first and second synchronization words may be a preamble of the first signal and an access address of the second signal, respectively.

Also, according to still another aspect of the present invention, there is provided a computer-readable recording medium having a program recorded thereon, the program for executing the method.

As described above, according to the present invention, in the environment where multiple signals on which frequency-shift keying is performed coexist, by using the multi-binary correlator that detects the correlation value using the synchronization words with orthogonality or quasi-orthogonality, a packet is independently and stably detected.

Also, according to the present invention, by using the binary correlator that uses only the sign of the frequency-demodulated signal for packet detection, an operation is performed regardless of the attenuation size of the reception signal so that a threshold value of a threshold detector is fixed for use without real-time tracking, whereby the present invention is effective for reducing inaccuracy of automatic gain control. Also, high complexity of conventional correlation operation is overcome and implementation with very simple Exclusive OR (XOR) is possible so that an operation is performed with low power.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Hereinbelow, exemplary embodiments of the present invention will be described in detail with reference to the accompanying drawings such that the invention can be easily embodied by one of ordinary skill in the art to which this invention belongs. In the following description, only portions necessary for understanding the operation according to the embodiments of the present invention are shown and described, and showing and description of other portions are omitted so as not to obscure the gist of the present invention. However, the present invention may be embodied in various different forms and should not be limited to the embodiments set forth herein.

Also, terms or words used in the specification and claims described herein are not limited to a meaning that is commonly understood by people or is defined in dictionaries, and should be interpreted as having a meaning that is consistent with meaning in the context of the relevant art in such a manner as to most appropriately describe the present invention.

Throughout the specification, when a part is referred to as being "connected" to another part, it includes not only being "directly connected", but also being "electrically connected" by interposing the other part therebetween. Also, when a part "includes" an element, it is noted that it further includes other elements, but does not exclude other elements, unless specifically stated otherwise.

For brief description, in the specification, one or more methods are described as a series of steps, for example, in the form of a flowchart. However, the present is not limited to the order of the steps, because it is well known that the steps may be performed in a different order than that shown and described in the specification according to the present invention or may be simultaneously performed with other steps. Also, not all illustrated steps need to implement the method according to the present invention.

In described various embodiments of the present invention, and the same name and the same reference numeral will be used to refer the corresponding constituents.

Throughout the specification, as an example of signals on which frequency-shift keying is performed, the Bluetooth standard is exemplified, but the present invention is not limited only to Bluetooth signals, and is applicable to various communication standards for receiving signals on which frequency-shift keying is performed.

Figure 8:
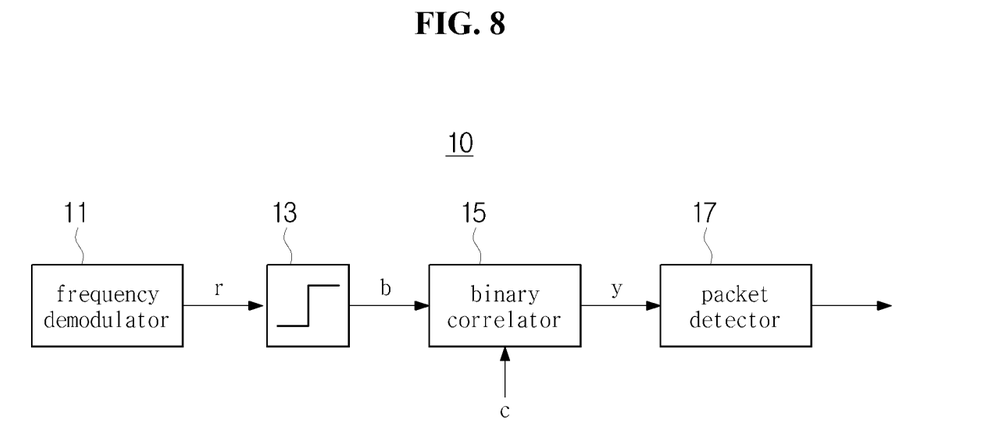
FIG. 8 is a block diagram illustrating a receiver that uses a packet detection method using a binary correlator according to an embodiment of the present invention.

FIG. 8 is a block diagram illustrating a receiver 10 that uses a packet detection method using a binary correlator according to an embodiment of the present invention.

Referring to FIG. 8, the receiver 10 according to the present invention may include a frequency demodulator 11, a bit discriminator 13, a binary correlator 15, and a packet detector 17. The receiver 10 may further include a sampler, a low-pass filter (LPF), and the like, but they are not shown for convenience of description.

The frequency demodulator 11 may generate a quasi-amplitude modulation signal r having a value proportional to frequency shift from the received frequency-shift keying signal.

The sign discriminator 13 may discriminate a sign b of the generated quasi-amplitude modulation signal r.

The packet detector 17 may cognize that a packet is normally detected, when a binary correlation value y is equal to or larger than a predetermined threshold value.

The binary correlator 15 may use, as an input, the sign b of the signal which has passed through the frequency demodulator 11. A correlation operation with a synchronization word c defined in a single bit may be replaced by simple counter, for example, Exclusive OR (XOR), and a binary correlation value, which is an output of the binary correlator 15, has a discrete value of $y[n] \in \{-N, \ldots, +N\}$. Since only sign information of a reception signal is used, a process of monitoring the size of the signal is unnecessary, and "a fixed threshold value" may be used. The above-described series of processes is shown in Equation 3.

$$b[n] = \begin{cases} +1, & \text{if } r[n] \geq 0 \\ -1, & \text{if } r[n] < 0 \end{cases} \quad \text{[Equation 3]}$$

$$y[n] = \sum_{k=0}^{N-1} c[n]b[n-k+(N-1)], \; y[n] \in \{-N, \ldots, +N\}$$

$$\text{pkt\_det} = \begin{cases} 1, & \text{if } y[n] \geq THR \\ 0, & \text{if } y[n] < THR \end{cases}$$

First, a process of obtaining the binary correlation value y by using Equation 3 and determining packet detection will be described. Assuming that the reception signal r={1.1, 1.4, 1.2, -1.2, 1.5, 1.2}, the synchronization word c={1, -1}, and the threshold value is 1.5, the sign b of the reception signal r which has passed through the sign discriminator 13 is as follows.

b={1, 1, 1, -1, 1, 1}

One sample per ADC sampling time interval is received, and an instantaneous value of the binary correlation value y at the corresponding time is calculated as follows. Here, the b vectors are buffered in order of reception.

T[0]: y={1,-1}×{1,0}=sum[{1,-1}×{0,1}]=-1

T[1]: y={1,-1}×{1,1}=sum[{1,-1}×{1,1}]=0

T[2]: y={1,-1}×{1,1}=sum[{1,-1}×{1,1}]=0

T[3]: y={1,-1}×{-1,1}=sum[{1,-1}×{1,-1}]=2

T[4]: y={1,-1}×{1,-1}=sum[{1,-1}×{-1,1}]=-2

T[5]: y={1,-1}×{1,1}=sum[{1,-1}×{1,1}]=0

T[6]: y={1,-1}×{0,1}=sum[{1,-1}×{1,0}]=1 y={-1, 0, 0, 2, -2, 0, 1}

The fourth output among the calculated binary correlation values y is 2, which is greater than the threshold value (1.5), and thus it is determined that there is a packet and an operation is performed in such a manner to perform synchronization at the relevant position.

Next, the conventional general correlation value calculation will be compared to the binary correlation value according to the present invention. To simplify the description, assuming that there are two synchronization words and the synchronization word is {1, -1}, a transmission end transmits a signal of {1, -1}.

First, assuming that there is no signal distortion, a reception end receives {+1, −1}. Here, the general correlation value is sum[{reception signal}×{synchronization word}]= sum[{+1, −1}×{+1, −1}]=2, and the binary correlation value is sum[{+1, −1}×{+1, −1}]=2. Assuming that the threshold value for determining whether or not there is a packet is 1.5, both correlation values are larger than the threshold value, and thus normal determination is made that the packet has been detected.

However, assuming that signal attenuation occurs in ½ during propagation into the air, in this case, the reception signal is {+0.5, −0.5}. Therefore, {+0.5, −0.5} is input to the correlator. Here, the general correlation value is sum[{reception signal}×{synchronization word}]=sum[{+0.5, −0.5}×{+1, −1}]=1 which is decreased by half as the signal is decreased in size. Accordingly, when the threshold value is not revised by tracking change in the size of the signal (namely, when the original 1.5 is not modified to 0.75 by scaling-down in half corresponding to signal size attenuation), there is a problem that when using the output from the general correlator, wrong determination (1<1.5) that there is no relevant packet is made.

In contrast, the binary correlation value is sum[{sign(+0.5), sign(−0.5)}×{+1, −1}]=sum[{+1, −1}×{+1, −1}]=2, which there is no difference from the previous result. Therefore, when using the output from the binary correlator 15, the packet detector 17 makes the normal determination (2>1.5) that the packet is present. That is, the binary correlator is advantageous in that since only the sign component of the input signal is used, an operation is possible regardless of the reception signal attenuation size, and the threshold value is also fixed for use without tracking the size of the signal.

Therefore, using the general correlator is disadvantages in terms of complexity in that an automatic gain controller is required, the signal attenuation size is required to be tracked in real time, and as the result, an operation is required to be performed in such a manner to reconstruct the size of the signal or adjust the threshold value. However, the binary correlator 15 and the packet detector 17 according to the present invention do not have the problem, so that these are strongly effective for reducing inaccuracy of automatic gain control.

Figure 9:
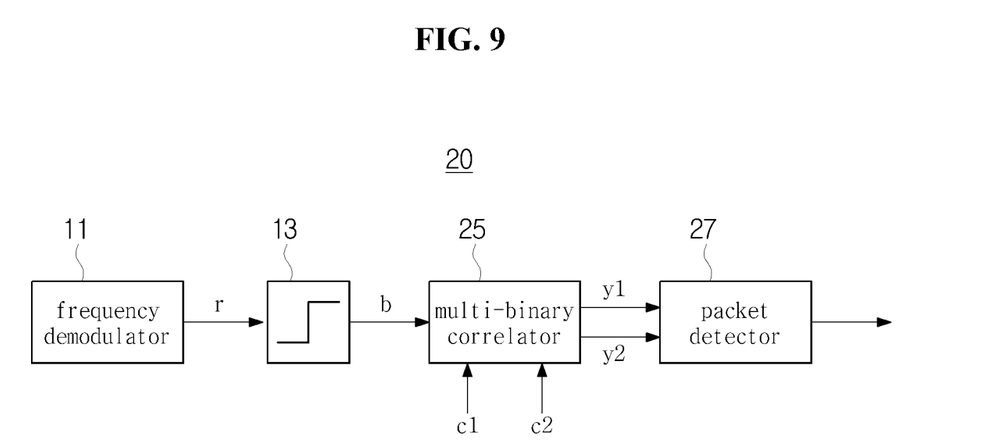
FIG. 9 is a block diagram illustrating a receiver that uses a packet detection method using a multi-binary correlator according to another embodiment of the present invention.
Figure 10:
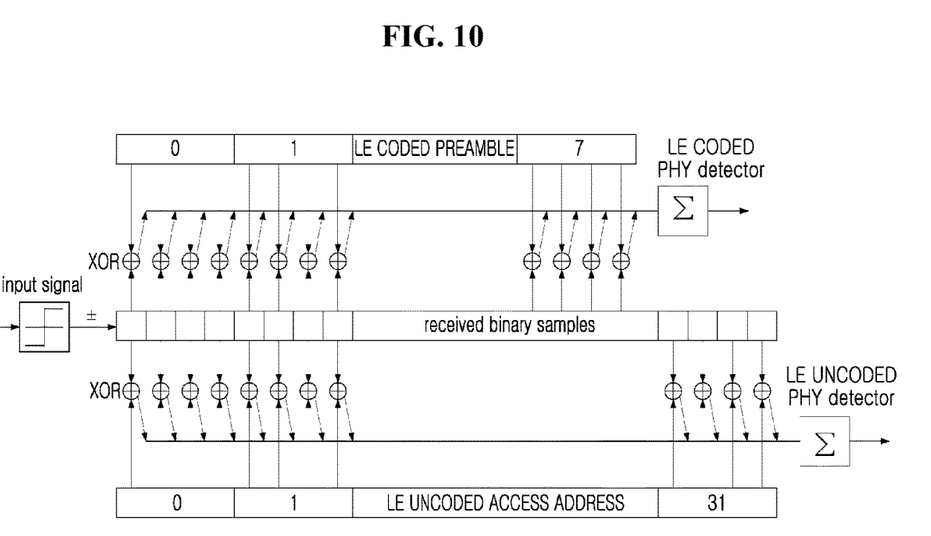
FIG. 10 is a block diagram illustrating a multi-binary correlator that determines whether a received signal is LE CODED PHY or LE UNCODED PHY according to still another embodiment of the present invention.

FIG. 9 is a block diagram illustrating a receiver 20 that uses a packet detection method using a multi-binary correlator 25 according to another embodiment of the present invention. FIG. 10 is a block diagram illustrating a multi-binary correlator 25 that determines whether a received signal is LE CODED PHY or LE UNCODED PHY according to still another embodiment of the present invention.

Referring to FIG. 9, the difference from FIG. 8 is a multi-binary correlator 25 and a packet detector 27.

Similar to the binary correlator 15, the multi-binary correlator 25 uses the sign b of the signal which has passed through the frequency demodulator 11, but differs in that two synchronization words c1 and c2 are used. Also, two binary correlation values y1 and y2 are calculated and output.

For example, with respect to Bluetooth again, an LE CODED PHY preamble is the form in which a binary string "00111100b" or "11000011b" is repeated every 8 μsec, and an LE UNCODED PHY preamble is the form in which a binary string "01b" or "10b" is repeated every 2 μsec. Therefore, in the correlator with an 8-μsec interval, the LE CODED PHY preamble synchronization word with intervals of 8 μsec and the LE UNCODED PHY binary string with intervals of 2 μsec have an orthogonality characteristic as in Equation 4.

$$y[n] = \sum_{8\mu sec} c_{coded\_phy} \cdot c_{uncoded\_phy} = 0 \qquad \text{[Equation 4]}$$

When as the synchronization word of the binary correlator 15, using the LE CODED PHY preamble which has orthogonality to the LE UNCODED PHY preamble, in the environment where the LE UNCODED PHY and the LE CODEC PHY coexist, the LE UNCODED PHY packet with a correlation measure of zero is filtered out and the LE CODED PHY packet with a high correlation measure is selectively detected.

Extending the above-described concept, in Bluetooth Smart environment where the LE CODED PHY signal and the LE UNCODED PHY signal coexist, there is no prior knowledge of the packet form of the currently received signal in terms of the reception end so that a Bluetooth Smart reception device requires a function of self-determining the packet form of the reception signal.

Referring to FIG. 10, shown is the embodiment in which with respect to synchronization words c1 and c2 of the multi-binary correlator 25 including Exclusive OR (XOR) logic, the LE CODED PHY packet detection uses, as the synchronization word, the LE CODED PHY preamble having orthogonality to the LE UNCODED PHY preamble, and LE UNCODED PHY packet detection uses, as the synchronization word, an access address having quasi-orthogonality to the LE CODED PHY packet. By receiving the input (the input signal) in which the output from the frequency demodulator 11 has passed through the sign discriminator 13, two synchronization words, namely, the LE CODED preamble c1 and the LE UNCODED access address c2 and the binary correlation values y1 and y2 are obtained, whereby in the Bluetooth Smart environment where packets in two forms coexist, a system capable of independent packet detection is implemented.

Regarding the mentioned quasi-orthogonality, when there is no correlation between two signals, the inner product between the two signals approximates to zero as the length of the vector increases, which is called quasi-orthogonality. Typically, there is quasi-orthogonality between random noise samples. The CODED PHY preamble has a pattern in which "0011100" is repeated, and the UNCODED PHY consists of a 32-bit quasi-random sequence. The inner product between the signals also has a value close to zero, so that there is quasi-orthogonality.

The packet detector 27 receives the two binary correlation values y1 and y2, and determines packet detection when the values are equal to or greater than a predetermined threshold value. For example, in the case where the synchronization word of the first signal is the c1 and is equal to or greater than a first threshold value so that packet detection is determined, when the y1 is equal to or greater than the first threshold value, the packet of the first signal is normally detected. Similarly, in the case where the synchronization word of the second signal is the c2 and is equal to or greater than a second threshold value so that packet detection is determined, when the y2 is equal to or greater than the second threshold value, the packet of the second signal is normally detected.

Since the c1 and the c2 have orthogonality or quasi-orthogonality, the y1 and the y2 do not simultaneously exceed the threshold value, whereby the receiver 20 is prevented from entering an abnormal packet detection state.

Figure 11:
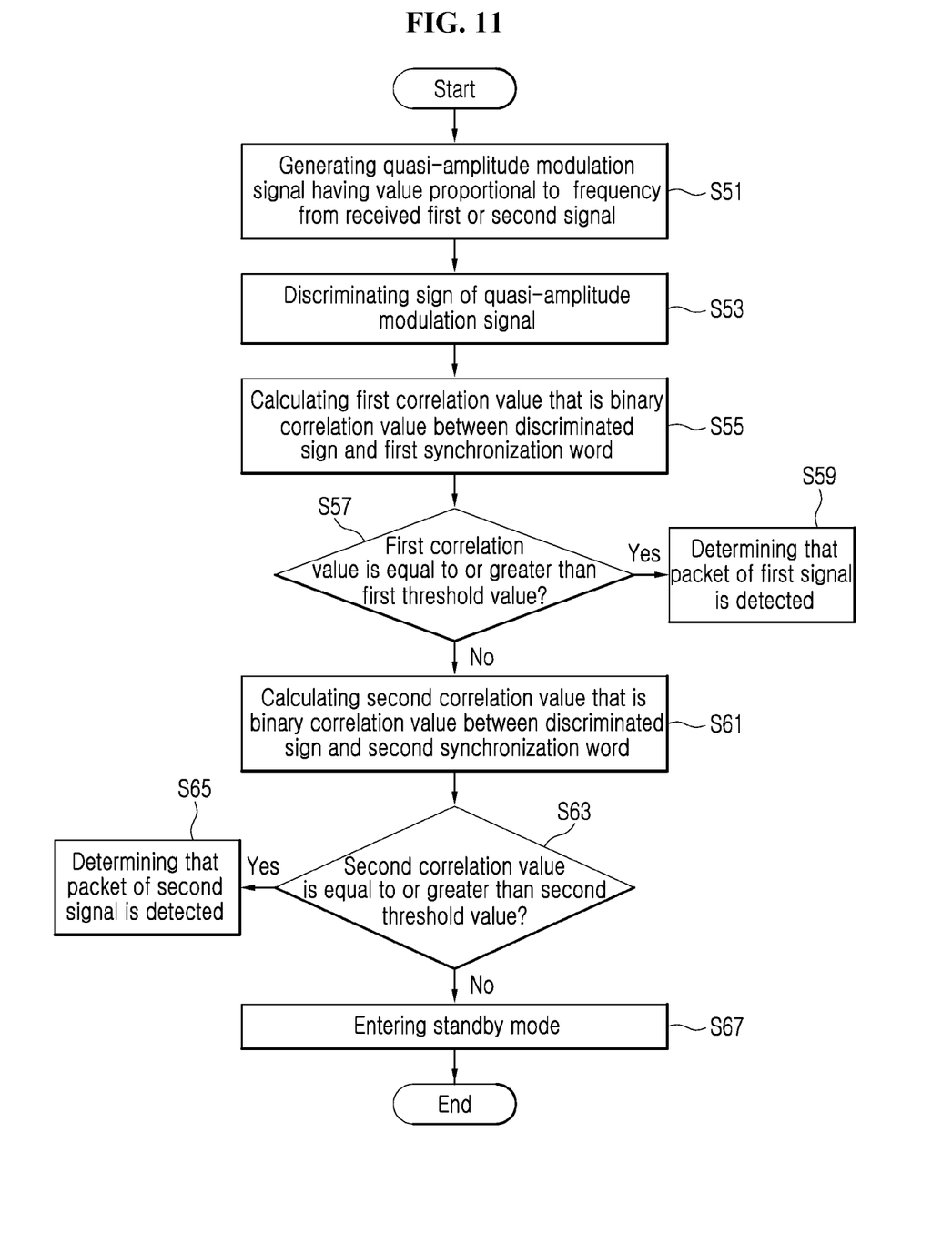
FIG. 11 is a flowchart illustrating a detailed example of an independent packet detection method using synchronization words that have orthogonality according to still another exemplary embodiment of the present invention.

FIG. 11 is a flowchart illustrating a detailed example of an independent packet detection method using synchronization words that have orthogonality according to still another exemplary embodiment of the present invention. For convenience of description, description will be made in comparison with the embodiment shown in FIG. 10.

Referring to FIG. 11, in the environment where the first signal and the second signal on which frequency-shift keying is performed coexist, as a frequency-shift keying signal reception method performing independent packet detection, a quasi-amplitude modulation signal which has a value proportional to frequency shift may be generated from the received first signal or second signal at step S51.

Comparing to the embodiment in FIG. 10, the first signal may be an LE CODED PHY signal, and the second signal may be an LE UNCODED PHY signal.

At step S53, the sign of the quasi-amplitude modulation signal generated at step S51 may be discriminated.

At step S55, a first correlation value, which is the binary correlation value between the discriminated sign at step S53 and a first synchronization word, may be calculated. Comparing with the embodiment in FIG. 10 again, the first synchronization word is an LE CODED preamble.

When the calculated first correlation value is equal to or greater than the first threshold value at step S57, it is determined that the packet of the first signal is detected at step S59. Then, LE UNCODED PHY detection is stopped, and an LE CODED PHY signal reception step is entered so that a signal reconstruction process, such as frequency offset estimation, is performed and a normal reception bit determiner may transmit a reconstruction reception bit to a link layer which is an upper layer.

When the calculated first correlation value is not equal to or greater than the first threshold value at step S57, a second correlation value, which is the binary correlation value between the discriminated sign at step S53 and a second synchronization word, is calculated at step S61. Here, the second synchronization word may be the LE UNCODED access address. Here, it is preferred that the first and second synchronization words have orthogonality or quasi-orthogonality to each other.

Here, since the LE UNCODED preamble and the LE UNCODED access address have orthogonality, the LE CODED binary correlation value y1 has a low value and the LE UNCODED PHY binary correlation value y2 has a high value.

When the calculated second correlation value is equal to or greater than the second threshold value at step S63, it is determined that the packet of the second signal is detected at step S65. Then, all PHY detection is stopped, and an LE UNCODED signal reception step is entered so that the signal reconstruction process, such as frequency offset estimation, is performed and the normal reception bit determiner may transmit the reconstruction reception bit to the link layer which is the upper layer.

The calculated first and second correlation values are values calculated regardless of the attenuation size of the received first and second signals, and may be calculated by Exclusive OR (XOR) of the discriminated sign and the first and second synchronization words, respectively.

When the calculated second correlation value is not equal to or greater than the second threshold value at step S63, the receiver 20 enters a standby mode at step S67. For example, an operation is performed in such a manner that a search window for packet detection is opened according to the relevant time slot and a sleep mode is entered when no packet is detected within the time to wait for the subsequent time slot so as to reduce power consumption. That is, no detection within the relevant time may be implemented as timeout of a watchdog timer.

As described above, according to the embodiments, by using the binary correlator that uses only the sign of the frequency-demodulated signal for packet detection, an operation is performed regardless of the attenuation size of the reception signal so that a threshold value of a threshold detector is fixed for use without real-time tracking, whereby the present invention is effective for reducing inaccuracy of automatic gain control. Also, high complexity of conventional correlation operation is overcome and implementation with very simple Exclusive OR (XOR) is possible so that an operation is performed with low power.

Also, according to the embodiments, in the environment where multiple signals on which frequency-shift keying is performed coexist, by using the multi-binary correlator that detects the correlation value using the synchronization words with orthogonality or quasi-orthogonality, the packet is independently or stably detected.

Also, the above-described embodiments of the independent packet detection method using synchronization words with orthogonality may be implemented in the form of computer program instructions that are executed on various computer elements. Also, the implemented computer program may be recorded on a computer-readable recording medium. The recording medium may be a ROM, a magnetic disc, a compact disc, an optical disc, or the like, but it is not limited thereto.

Although the embodiments according to the present invention have been disclosed for illustrative purposes, those skilled in the art will appreciate that various modifications, additions and substitutions are possible. It is thus well known to those skilled in that art that the patent right of the present invention should be defined by the scope and spirit of the invention as disclosed in the accompanying claims.

What is claimed is:

1. A frequency-shift keying signal receiver performing independent packet detection in an environment where a first signal and a second signal on which frequency-shift keying is performed coexist, the receiver comprising:
   a frequency demodulator generating a quasi-amplitude modulation signal that has a value proportional to frequency shift from the first signal or second signal being received;
   a sign discriminator discriminating a sign of the generated quasi-amplitude modulation signal; and
   a multi-binary correlator calculating a first correlation value that is a binary correlation value between the discriminated sign and a first synchronization word and calculating a second correlation value that is a binary correlation value between the discriminated sign and a second synchronization word,
   wherein the first and second synchronization words have orthogonality or quasi-orthogonality to each other.

2. The receiver of claim 1, further comprising:
   a packet detector determining packet detection of the first signal when the calculated first correlation value is equal to or greater than a first threshold value or determining packet detection of the second signal when the calculated second correlation value is equal to or greater than a second threshold value.

3. The receiver of claim 1, further comprising:
   a packet detector entering a standby mode when the calculated first and second correlation values are less than first and second threshold values, respectively.

4. The receiver of claim 1, wherein the calculated first and second correlation values are values calculated regardless of attenuation sizes of the received first and second signals.

5. The receiver of claim 1, wherein the first correlation value is calculated by Exclusive OR (XOR) of the discriminated sign and the first synchronization word, and
the second correlation value is calculated by Exclusive OR (XOR) of the discriminated sign and the second synchronization word.

6. The receiver of claim 4, wherein the first and second synchronization words are a preamble of the first signal and an access address of the second signal, respectively.

7. A frequency-shift keying signal reception method performing independent packet detection in an environment where a first signal and a second signal on which frequency-shift keying is performed coexist, the method comprising:
generating a quasi-amplitude modulation signal that has a value proportional to frequency shift from the first signal or second signal being received;
discriminating a sign of the generated quasi-amplitude modulation signal;
calculating a first correlation value that is a binary correlation value between the discriminated sign and a first synchronization word; and
calculating a second correlation value that is a binary correlation value between the discriminated sign and a second synchronization word,
wherein the first and second synchronization words have orthogonality or quasi-orthogonality to each other.

8. The method of claim 7, further comprising:
determining packet detection of the first signal when the calculated first correlation value is equal to or greater than a first threshold value, or determining packet detection of the second signal when the calculated second correlation value is equal to or greater than a second threshold value.

9. The method of claim 7, further comprising:
entering a standby mode when the calculated first correlation value is less than a first threshold value and the calculated second correlation value is less than a second threshold value.

10. The method of claim 7, wherein the calculated first and second correlation values are values calculated regardless of attenuation sizes of the received first and second signals.

11. The method of claim 7, wherein the first correlation value is calculated by Exclusive OR (XOR) of the discriminated sign and the first synchronization word, and
the second correlation value is calculated by Exclusive OR (XOR) of the discriminated sign and the second synchronization word.

12. The method of claim 7, wherein the first and second synchronization words are a preamble of the first signal and an access address of the second signal, respectively.

13. A non-transitory computer-readable recording medium having a program recorded thereon, the program for executing a frequency-shift keying signal reception method performing independent packet detection in an environment where a first signal and a second signal on which frequency-shift keying is performed coexist, the method comprising:
generating a quasi-amplitude modulation signal that has a value proportional to frequency shift from the first signal or second signal being received;
discriminating a sign of the generated quasi-amplitude modulation signal;
calculating a first correlation value that is a binary correlation value between the discriminated sign and a first synchronization word; and
calculating a second correlation value that is a binary correlation value between the discriminated sign and a second synchronization word,
wherein the first and second synchronization words have orthogonality or quasi-orthogonality to each other.

14. The non-transitory computer-readable recording medium of claim 13, wherein the method further comprises:
determining packet detection of the first signal when the calculated first correlation value is equal to or greater than a first threshold value, or determining packet detection of the second signal when the calculated second correlation value is equal to or greater than a second threshold value.

15. The non-transitory computer-readable recording medium of claim 13, wherein the method further comprises:
entering a standby mode when the calculated first correlation value is less than a first threshold value and the calculated second correlation value is less than a second threshold value.

16. The non-transitory computer-readable recording medium of claim 13, wherein the calculated first and second correlation values are values calculated regardless of attenuation sizes of the received first and second signals.

17. The non-transitory computer-readable recording medium of claim 13,
wherein the first correlation value is calculated by Exclusive OR (XOR) of the discriminated sign and the first synchronization word, and
the second correlation value is calculated by Exclusive OR (XOR) of the discriminated sign and the second synchronization word.

18. The non-transitory computer-readable recording medium of claim 13, wherein the first and second synchronization words are a preamble of the first signal and an access address of the second signal, respectively.

* * * * *